Sept. 23, 1958  J. V. PETRIELLO  2,852,811
METHOD FOR CASTING THIN PLASTIC FILMS
Filed March 1, 1954

INVENTOR
JOHN V. PETRIELLO
BY
ATTORNEY

United States Patent Office 2,852,811
Patented Sept. 23, 1958

2,852,811

METHOD FOR CASTING THIN PLASTIC FILMS

John V. Petriello, Queens Village, N. Y.

Application March 1, 1954, Serial No. 413,024

6 Claims. (Cl. 18—57)

This invention relates to the art of plastic film fabrication and particularly concerns the fabrication of very thin continuous films of polytetrahaloethylene.

In one aspect which is particularly important for electrical insulation applications, the invention relates to the making of extremely thin dielectric films which, when made in the manner described herein, have exceptionally high dielectric strength of uniform quality. Although the invention is particularly concerned with the preparation of thin films of such polytetrahaloethylenes as polytetrafluorethylene, polychlorotrifluoroethylene, etc., the invention is not limited to these materials and may be extended to cellulose acetate, cellulose esters, nylon, polystyrene, polyethylene, vinyls, rubber hydrochloride and the like.

At present there are several methods for preparing thin films of polytetrafluoroethylene. One of these is to skive off a continuous layer from a cylindrical block of the polytetrafluoroethylene made by compacting the relatively coarse granular material and sintering above the 327° C. transition temperature of the polymer. The principal objections to this method are the expense of maintaining extremely sharp knife-edges of the skiving blade and tendency to form continuous gouge lines with dulled, worn-out edges resulting in thinner profiles than desired. The latter is a constant source of mechanical weakness, showing up with low tear strength, and lowered dielectric strength; to correct for the latter weakness, it is often necessary to use two or more layers of the skived film as a dielectric to reduce the number of electrical holes or to apply flooding oils or sealants at greater expense to cover up these weaknesses which at best is only a temporary expedient as most oils either evaporate, ooze out, or degrade in time to poorer oxidized dielectrics or are generally inferior and do not match the chemical inertness, temperature resistance, and uniform dielectric quality at a wide frequency range of the polytetrafluoroethylene. Moreover, the skiving is limited practically to thickness of only 0.003 inch as any thinner cut greatly increases the chances of introducing holes not only by the gouge lines on both sides of the shaved film but also by the infinitesimally small voids that exists inbetween the sintered granules of the polymer. In general, shaved films of this general type are highly porous when made in low thickness ranges.

Another method of forming relatively thin polytetrafluoroethylene films that are less porous at a given thickness is by casting the finely-divided form of the polymer from a suitable aqueous dispersion. Such dispersions are characterized by extremely small particle sizes appreciably less than 1 micron as described in Industrial and Engineering Chemistry, volume 44, pp. 1800–1805 (1952). The polytetrafluoroethylene in the aqueous dispersion form can be spread onto a metal surface and then fused to a continuous film superior to skived film by virtue of lower degree of porosity and higher dielectric strengths. The advantages of this cast, sintered film made from the water-dispersed polymer over the skived tape are readily understandable when one considers that the fluid deposition permits a greater degree of compacting of the finer dispersion particles. However, the deposition of the dispersion polymer into a usable, high dielectric strength film presents difficulties in stripping and handling the extremely thin films which often lead to considerable non-uniformity in dielectric strength.

In another known method of forming relatively polytetrafluoroethylene films, a liquid dispersion of a finely divided form of the polymer is deposited on an oxidizable metal surface. The liquid carrier is then evaporated and the residual particles are fused to leave a continuous, transparent, self-supporting film to be stripped off the metal surface. The liquid carrier is a volatile fluid containing a hydroxy group, and may be water or a mixture of ethyl alcohol and water. During fabrication of the film, it is believed that the hydroxy group unites chemically with the oxidizable metal, to form a chemical layer which facilitates stripping of the film from the metal. The process requires use of an oxidizable metal such as copper or iron, and an acid bath to clean the metal surfaces. A particular disadvantage of this process is that particles of iron or copper oxide frequently are occluded in and contaminate the film so that its usefulness as a dielectric material is impaired. To clean the film in acid is a troublesome procedure and not always fully effective. The acid employed in the process also presents many burdensome problems of handling storage and is further objectionable because it is wholly expended in the cleaning operations for which it is used so that it increases the costs of the process and also results in waste products which are very difficult to dispose of satisfactorily. If ethyl alcohol or the like is added to the liquid carrier it further increases the cost of fabrication of the film. Another objection is the limited range of thicknesses of film which the process will yield. If films having thicknesses exceeding .001 inch are required, the process cannot be used.

The present invention is directed to overcoming the disadvantages and difficulties and many other objectionable features inherent in the above mentioned and all prior known methods for forming continuous plastic films.

In a preferred embodiment of the invention a thin layer of finely divided colloidal-sized polytetrafluoroethylene is laid down uniformly on the surface of a prepared, highly polished substantially inert metal base such as stainless steel. The metal base is non-oxidizing and non-reactive chemically in water and air. The polytetrafluoroethylene resin particles have maximum diameters of less than one micron and are dispersed in water to a predetermined concentration. If desired relatively small quantities of suitable dispersing and/or thickening agents may be added to the aqueous dispersion. The polymer solids content will be determined by the desired thickness of the resulting film. The metal base surface is first prepared py proper buffing or polishing to a critical smoothness. The aqueous dispersion is deposited on the metal by dipping. Immediately thereafter the metal coated with the aqueous dispersion is heated at about 120° C. to evaporate the water and then the dried resin and metal base are heated to a temperature above 350° C. to sinter the resin particles into a continuous film. By repeating the sequence of deposition, drying, and sintering the film thickness can be built up to .003 inch or more in thickness. The film is then stripped from the metal base. When a metal belt of suitable width and length is used as the metal base, the film may be formed continuously and collected from both sides of the belt on suitable rolls.

It is therefore a principal object of the invention to provide a process for making consistently high strength films of greater uniformity in surface and dielectric characteristics than has heretofore been possible.

It is a further object to provide a process for casting, sintering, and stripping a continuous length of a polytetrahaloethylene film based on a specially prepared metal surface of critical smoothness.

Another object of the invention is to provide a method for fabricating a plastic film having superior smoothness.

Another object of the invention is to provide a method for fabricating a plastic film having a predetermined thickness as great as .003.

It is a further object to provide a method for fabricating a continuous plastic film having any desired thickness in the range of 0.0001 to 0.003 inch.

Other and further objects and advantages of the invention will become apparent from the following description taken together with the drawing wherein.

Figure 1:
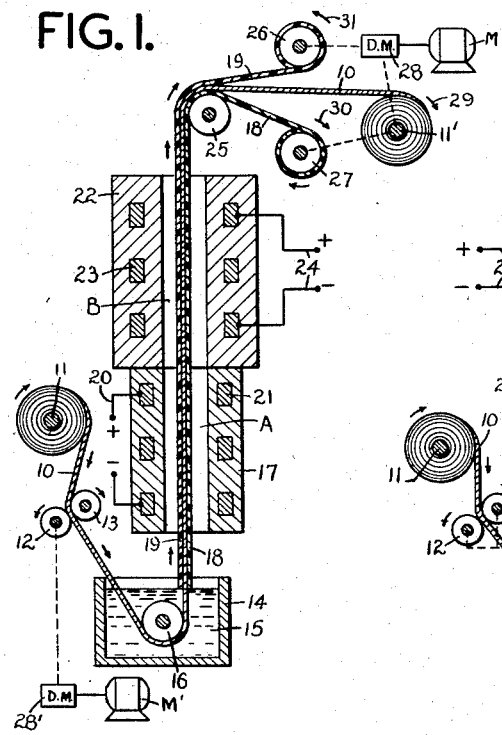
Fig. 1 is an elevational view of a single stage deposition apparatus embodying the invention.

In Fig. 1, a light gauge flexible, stainless steel belt or strip 10 of the order of several inches in width or more is carried by a roller 11 adjustable tensioned by appropriate friction means. The belt 10 is led down through buffing rollers 12, 13 into the container 14 which contains the aqueous dispersion of polytetrafluorethylene particles 15. The consistency and solids content of the dispersion are fixed at predetermined values based on considerations to be described later. After passing around the idler roller 16, the belt emerges coated with wet layers 18, 19 into the drying oven 17 having a drying zone A. The drying area is maintained at a temperature between 60° C. and 150° C. by means of electrical elements 21 supplied with power from a suitable source via conductors 20. The drying oven may be an electrically heated warm air type as shown or may be a gas fired flue chamber, or a double bank of infrared lamps having its rays directed on the passing belt. From the drying zone A the belt continues its upward movement into the sintering zone B of the oven 22. The sintering oven is maintained at a temperature varying from about 290° C. at the entrance to the zone B to about 410° C. near the exit from the zone B by a series of electrical resistance elements 23 energized from a suitable power source via conductors 24. On emerging from oven 22, the belt 10 carries a pair of layers of film readily separable from the metal base. The belt and layers pass over idler roller 25 and the film layers are then taken up on their respective rollers 26, 27 while the belt is wound upon roller 11'. Roller 11' with the belt 10 fully wound thereon may then be used to replace the empty roller 11 at the initial feeding position preceding rollers 12, 13 for repeating the operating cycle. The roller 11' in the final take-up position is driven by a suitable drive mechanism 28, powered by a motor M which rotates roller 11' in the direction shown by arrow 29 to effect unwinding of the belt at the initial position, passage through container 14, oven areas A and B, and rewinding of the belt on roller 11'. The drive mechanism (D. M.) also is connected to rollers 26, 27 to effect take-up of film on the respective rollers as they rotate in the direction shown by arrows 30. Rollers 12, 13 are rotated by a drive mechanism 28' in a direction as shown by arrows 31 which opposes the direction of movement of belt 10 from roller 11 so that the rollers 12, 13 effectively buff the belt before its immersion in the container 14. It will be noted that surface of belt 10 throughout the buffing, dipping, drying, sintering and stripping operations remains free of acids, oxides and all other foreign materials which might react chemically with the metal and become occluded in the plastic film. Although stainless steel is a preferred material for the belt 10 satisfactory results will be obtained with belts made of nickel or nickel plated steel, or chromium finished metals having highly polished surfaces. In all cases the surfaces should have less than 250 microinches of roughness. In no case should a material which oxidizes in air or water or which otherwise reacts with air or water or the usual impurities found therein be used for the belt employed in the present process and apparatus. If such a metal must be used it should be heavily plated preferably with nickel and chromium so that only substantially chemically inert surfaces are exposed to the aqueous dispersion of plastic material and the resulting films.

Figure 2:
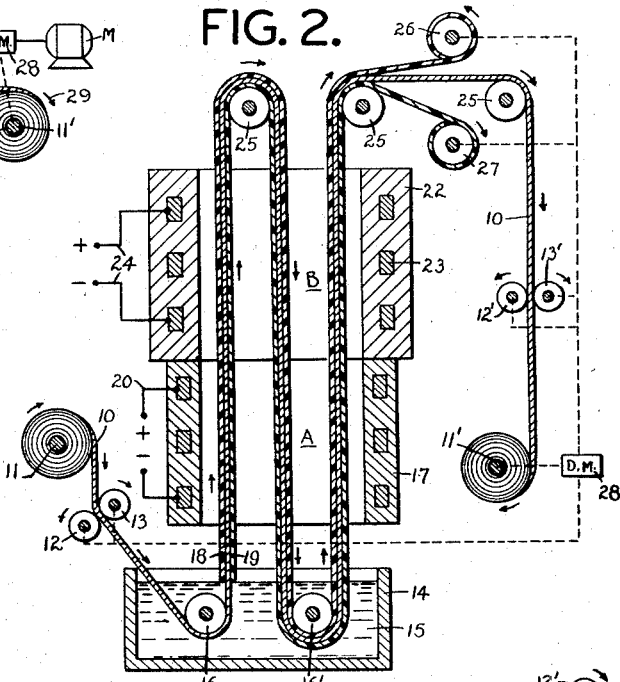
Fig. 2 is a view of a multistage deposition apparatus embodying the invention.

In Fig. 2 is shown an embodiment of the invention in which parts corresponding to Fig. 1 are correspondingly numbered. It will be noted that belt 10 is subjected to at least two dips in container 14 as it passes around rollers 16, 16' to produce films having a greater thickness than is obtainable with a single dip as in Fig. 1. By a succession of dips exceeding even the two dip stages illustrated, films of increased thickness up to 0.003 inch or more are obtainable. On each emersion from the container 14, the belt carrying a layer of the finely divided plastic material in aqueous dispersion, passes through the drying zone A and sintering zone B and then over an idler guide roller 25 to be immersed again in tank 14. After the final sintering step the belt 10 carrying films 18, 19 passes over the final idler roller 25 and the films are wound on rollers 26, 27. A pair of buffing rollers 12', 13' pretreat the surfaces of the belt before it is rewound on roller 11'. The drive mechanism 28 is arranged to drive all rollers 11', 12, 12', 13, 13', 26, 27 in coordination so that the belt passes uniformly from roll 11 to roll 11' while the rollers 12, 12', 13, 13' effectively buff or polish the belt surface to the necessary smooth condition. The rollers 12, 13, 12', 13' will generally rotate at a much faster rate than rollers 11', 26, 27 in order to accomplish the smoothing or refinishing operation.

Figure 3:
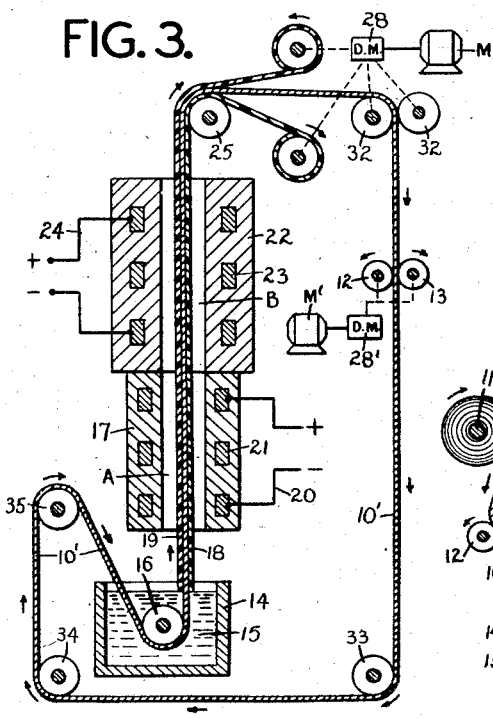
Fig. 3 shows an apparatus embodying the invention and including an endless belt.

In Fig. 3 is shown apparatus similar to Fig. 1 except that a seamless endless belt 10' is provided to yield film strips 18, 19 of indefinite and continuous length. After the films are dried, sintered and stripped from the belt they are wound on rollers 26, 27 while the belt is refinished by the rollers 12, 13 to requisite smoothness before returning to the container 14 via idling transfer rollers 33, 34, 35. Rollers 32 are drive rollers for belt 10' and together with rollers 26, 27 are driven via a suitable drive mechanism 28 while buffing rollers 12, 13 are driven by a drive mechanism 28'.

Figure 4:
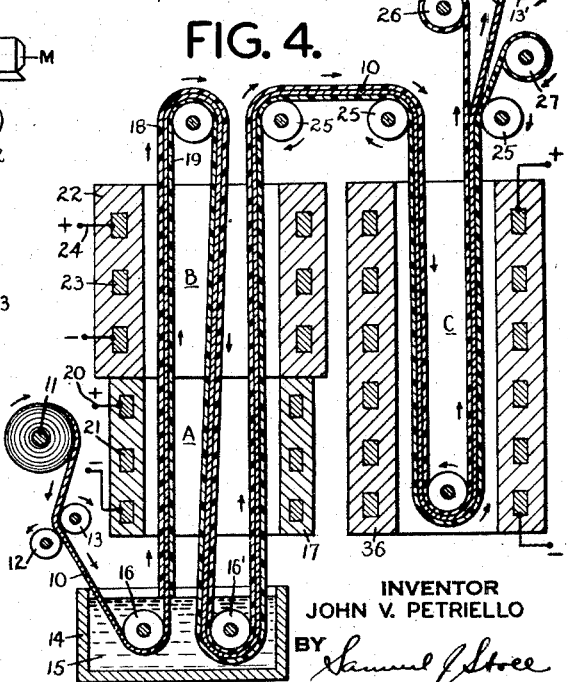
Fig. 4 shows a multistage apparatus embodying the invention including heating means for drying, sintering and baking the plastic films.

In Fig. 4 is shown a multistage apparatus similar to Fig. 2 with the addition of an oven 36 which provides an additional baking or curing period to the sintered films. This additional baking is required if the aqueous dispersion 15 of polytetrafluoroethylene includes added wetting and thickening agents which may not be fully volatilized and driven off during the previous drying and sintering steps. This oven contains a baking zone C maintained at a temperature of about 327° C. and provides a baking period of from 10 to 35 minutes. When these residual wetting and thickening agents are fully baked out, the films strip easily from the belt.

It will be noted that as the belt 10 leaves the container 14 after the final dipping as shown in both Figs. 2 and 4 the thickness of each layer of film is greater before immersion. This building up of the thickness of the film by successive dips is found to result in a wholly homogeneous single layer film after the sintering is completed, and the film is not multilayered or laminated as might be expected because of the sintering between successive dips. The fusion which takes place between the several coats of resin is complete and makes possible production of single layer homogeneous films of any predetermined thickness and width.

The quality of the films produced by the method and apparatus of the present invention are related directly to the degree of smoothness or conversely degree of roughness of the surfaces of the metal base upon which the films are cast. This relationship may be illustrated by the following examples:

EXAMPLE 1

A series of 30-gauge U. S. Standard stainless steel panels having a width of 8 inches and lengths up to 50 feet have been polished to a progressive series of smoothness ranging from approximately 250 down to 4 microinches as measured by tactual comparison with the American Standards Association B46.1—1947 surface roughness specimens. Using a polytetrafluoroethylene dispersion diluted to 35 percent solids, two coatings have been applied to form 0.00025 inch films by the continuous dipping method above described, sintered and hand-stripped. The marked differences in strippability as a measure of handling qualities and dielectric strength obtained on the various surfaces are summarized in the following table. The strippability was estimated by pulling of the film using a ¼-inch wide purchase widthwise to the direction of film casting. The dielectric strength was determined according to the method D—149—44 of the American Society for Testing Materials (A. S. T. M.) based on an average of 10 random readings.

*Table I*

STRIPPABILITY AND DIELECTRIC STRENGTH OF 0.00025 INCH FILM

| Casting Surface Roughness (microinches) [1] | Strippability | Pull, lb./in. width | Dielectric Mil average Value | Strength, Volts/M Deviation |
|---|---|---|---|---|
| 250 | Strips off with difficulty; marked tendency to tear at pull. | 1.0 | 3,080 | ±480 |
| 125 | Strips off with difficulty with occasional tearing at edges. | 1.0 | 3,360 | ±480 |
| 63 | Strips off readily with no tears. | 0.6 | 3,610 | ±420 |
| 32 | Strips off readily, smoothly. | 0.2 | 3,840 | ±360 |
| 16 | Strips off readily | 0.1 | 3,920 | ±260 |
| 8 | do | 0.1 | 3,900 | ±240 |
| 4 | do | 0.1 | 3,940 | ±240 |

[1] As determined tactually by comparison with standard specimens.

The above data clearly indicate several marked effects of the surface smoothness on the quality of the film. First, a marked improvement in the ease of strippability of the exceedingly thin film becomes apparent as the surface roughness is decreased. Whereas the film cast over a surface with a roughness of 250 microinches stripped with difficulty and tore at a one-pound pull, the film cast over a surface with a roughness of 63 microinches stripped with no tearing; with decreasing surface roughness, and correspondingly increasing smoothness, the stripping required progressively less pull. Secondly, the average short-time dielectric strength increased progressively from 3080 volts per mil when cast at a surface roughness of 250 microinches to 3940 volts per mil when cast over a surface roughness of 4 microinches. It is also significant to note from the quality standpoint that the uniformity improves correspondingly as indicated by the narrowing deviation values with increasing surface smoothness. The latter is an important factor for high-quality dielectric in precision equipment where considerable reliance is made upon consistently uniform dielectric strength. The extreme thinness of film described herein is obtainable only by the high degree of surface smoothness; such a thin film is not obtainable by any skiving method but can only be obtained by casting.

EXAMPLE 2

Using the same series of stainless steel surfaces described in the above Example 1, a series of 0.002-inch thick cast films have been made using two coatings (.001 inch per coat) from a 58 percent polytetrafluoroethylene solids dispersion employing the same dipping, drying and sintering operations. As in the previous example, a marked difference in strippability and dielectric strength has been observed as shown in the following Table II.

*Table II*

STRIPPABILITY AND DIELECTRIC STRENGTH OF 0.002-INCH FILM

| Casting Surface Roughness (microinches) | Strippability | Pull, lb./in. | Dielectric Volts/Mil Average Value | Strength, Volts/Mil Deviation |
|---|---|---|---|---|
| 250 | Strips off with slight tearing. | 1.0 | 3,060 | ±380 |
| 125 | Strips off readily | 1.0 | 3,280 | ±300 |
| 63 | do | 0.6 | 3,590 | ±300 |
| 32 | do | 0.2 | 3,870 | ±240 |
| 16 | do | 0.15 | 3,890 | ±180 |

The above data also indicate the combination of improved strippability, with a finish that is smoother than 250 microinches roughness, and increased dielectric strength as the casting surface smoothness is increased. Moreover, as noted with the 0.00025-inch thick film, the highly-finished surfaces show less deviation from the average dielectric strength values thus permitting a higher degree of uniformity.

One of the unique features of the cast film compared to the skived film made at comparable thickness is the higher tear strength of the former. Table III below shows a comparison of a series of castings made over a stainless steel surface finished to 32 microinches roughness with films of equivalent thickness made by skiving from a molded cylinder of the polymer. These results show a marked superiority of the cast film over the skived film. Moreover, the tear strength is uniformly the same regardless of the casting direction, whereas the skived film is considerably weaker in the transverse direction. In many applications, the need for film of high and uniform tear strength is of paramount importance especially in the wrappings around intricate shapes such as armatures and coils.

*Table III*

TEAR STRENGTHS OF SMOOTH-SURFACE CAST FILMS vs. SKIVED FILM TEST METHOD: A. S. T. M. D-624

| Film Thickness (inch) | Type of Film | Tear Strength Longitudinal [1] lb./in.[2] | Transverse |
|---|---|---|---|
| 0.0005 | Cast | 640 | 640 |
|  | Skived—Not obtainable |  |  |
| 0.001 | Cast | 625 | 625 |
|  | Skived—Not obtainable |  |  |
| 0.002 | Cast | 600 | 600 |
|  | Skived | 475 | 220 |
| 0.003 | Cast | 590 | 590 |
|  | Skived | 460 | 200 |

[1] Cast film: along direction of casting. Skived film: machine direction.
[2] Cast film: at right angle to direction of casting. Skived film: at right angle to machine direction.

Another unique characteristic of the stripped thin polytetrafluoroethylene films cast on high polished surfaces according to the invention is the correspondingly higher impermeability to moisture with increasing smoothness. This is evident from the following series of water vapor permeability data determined by the American Society for Testing Materials method D697-42T on 0.002-inch film made by two coatings of the aqueous polytetrafluoroethylene dispersion on the same series of surfaces described in the above example; for purposes of comparison permeability data on 0.003-inch thick skived sheeting are also included.

*Table IV*

MOISTURE PERMEABILITY OF CAST FILM

Thickness: 0.002-inch

| Casting Surface Roughness Scale (Microinches) | Water Vapor Permeability, g./sq. meter/24 hr. (25° C., 50% relative humidity) |
| --- | --- |
| 250 | 0.074 |
| 125 | 0.041 |
| 63 | 0.034 |
| 32 | 0.028 |
| 16 | 0.029 |
| 8 | 0.028 |
| Skived sheet (0.003″) | 0.210 |

From the above data it is obvious that higher degree of water vapor impermeability of the cast film is obtained with greater surface smoothness with minimum permeability reached at approximately 32 microinches roughness. The skived sheet, however, is considerably poorer in this respect and would therefore be inferior in applications where protection against moisture in many coil and armature windings is essential.

In order to obtain the various film thicknesses from as low as 0.00025-inch to 0.003-inch or greater, it is simply necessary to adjust the solids content of the polytetrafluoroethylene dispersions. Thus, in depositing a casting by dipping vertically the prepared metal, the lower the solids content the thinner is the ultimate fused film; conversely, the higher the solids content the thicker is the fused film. Usually at least two coatings are applied in order to cover any microscopic craters due to fine foams in the dispersion. Typical thicknesses obtained by two-coating procedures using a commercial "Teflon" tetrafluoroethylene resin dispersion containing 6% "Triton" x-100 based on polymer content deposited over a 32 micro-inch stainless steel surface are listed as follows:

*Table V*

FILM THICKNESS VS. POLYMER SOLIDS CONTENT (TWO-COAT PROCEDURE)

| Polytetrafluoroethylene Solids (Percent) | Thickness (inch) |
| --- | --- |
| 30.4 | 0.00022 |
| 35.6 | 0.00025 |
| 40.8 | 0.00053 |
| 51.0 | 0.00085 |
| 59.9 | 0.00105 |

The above film thicknesses can be increased by using thickened dispersions whereby a heavier casting is achieved. The thickening of the dispersion can be achieved by adding either additional "Triton" x-100 (which is a surface-active aryl-alkyl polyether) or supplemental amounts of emulsified resins such as polystyrene, copolymers of styrene with butadiene and acrylonitrile, polyisobutylene and polymethyl methacrylate. These resins are added in latex form to the polytetrafluoroethylene dispersions in amounts from 1 to 20 parts by weight to form viscous slurries. On sintering the dried castings, these added resins serve to hold together the polytetrafluoroethylene particles. At the same time the resins are gradually decomposed and volatilized off leaving a clean film layer of polytetrafluoroethylene.

The use of metal surfaces of high degree of smoothness for casting thin films from aqueous dispersions has been found to improve in like manner the dielectric properties and strippability of thin films made from aqueous dispersions of polychlorotrifluoroethylene. On ordinary stainless steel surfaces with a commercial finish of approximately 250 microinches a casting of this polymer could not be stripped as it was too well anchored in the mirco-cavities. However by developing a polished surface between 63 and 32 microinches, films as thin as 0.0005 inch could be readily stripped with only about a 2-pound pull. With increasingly higher polish, this pull required for stripping is reduced correspondingly with at least 20 percent increase in average dielectric strength.

The successful formation of strippable films of high dielectric quality has been found to be dependent upon a chemically non-reactive metal surface capable of resisting the etching effect of the polymer especially at the high sintering temperatures employed. Particularly suited as metal substrates are metals of group VIII of the periodic table including such elements as nickel, and cobalt and their alloys and such alloys of iron as stainless steel, with which as many as 20 to 30 castings have been made without any appreciable effect on surface profile. It is only necessary to give a light buffing with fine emery polishing as done by buffing rollers 12, 12', 13, 13' shown in the drawing to restore the surface finish when it begins to show a roughness than approaches 125 microinches or higher. In general, it is essential that the metal substrates form no unstable, oxidized or scaly surface. The addition of metal deactivators and corrosion inhibitors to the aqueous polymer dispersion preserves considerably the finish, making it possible to use the metal casting surface indefinitely.

Although the invention has been explained with particular reference to fabrication of polytetrafluoroethylene films, the method and apparatus are usable in fabrication of films in which the plastic material is either in the form of colloidal particles dispersed in a suitable liquid medium or the plastic material is dissolved in the liquid medium. Among the types of plastic materials which the present invention is adapted to fabricate into uniform films as thin as .0001 of an inch or as thick as .003 of an inch may be mentioned cellulose nitrate, cellulose acetate, cellulose ethers, cellulose mixed esters, nylon, polystyrene, polyethylene, vinyls, rubber hydrochloride, etc.

The films described herein have high dielectric strength and are useful for a variety of electrical applications including capacitors, spacers, insulation tape for winding over transformer coils, and laminates with other dielectric materials. The outstandingly high dielectric strength makes these films particularly suited for miniature and subminiature capacitors and electrical insulating devices.

It will be understood that various modifications may be made in the specific method and apparatus described in the several embodiments disclosed herein without departing from the spirit of the invention. All reasonable and lawful equivalents falling within the scope of the appended claims are to be deemed incident and ancillary to this invention. Having thus fully described the nature of the invention and the preferred embodiments thereof and the manner in which it can be carried out, I claim:

1. A method of preparing a uniform, self-supporting polytetrahaloethylene film of predetermined thickness, which comprises continuously depositing a layer of liquid dispersed polytetrahaloethylene particles, having maximum diameters of less than one micron, onto a metal casting surface, said metal being substantially inert chemically and non-oxidizable with respect to air and water, said surface being continuously polished to maintain a roughness of less than 250 micro-inches, continuously drying the layer to remove the liquid, continuously sintering the particles at temperatures below 300° C., repeating said continuous depositing, drying and sintering steps to obtain a homogeneous single layer film of predetermined thickness on said surface, continuously sintering said single layer of film at temperatures ranging from 350° C. to 400° C., continuously cooling the film rapidly thereafter, and continuously stripping the cooled film from said surface.

2. A method of making thin self-supporting plastic film, comprising the steps of continuously polishing a relatively non-oxidizable metal carrier to maintain a surface roughness of less than 250 micro-inches, continuously casting a thin plastic film on said surface, and continuously stripping said film from said surface.

3. A method of making thin self-supporting polytetrahaloethylene resin film, comprising the concurrent steps of continuously polishing a relatively non-oxidizable metal carrier to maintain a surface roughness of less than 250 micro-inches, continuously depositing a thin layer of an aqueous dispersion of polytetrahaloethylene resin particles on said metal carrier, continuously evaporating the water, continuously sintering the resin particles, and continuously stripping the resulting film from said metal carrier.

4. A method of making thin self-supporting polytetrahaloethylene resin film, comprising the steps of continuously polishing progressive portions of a relatively non-oxidizable metal carrier to maintain a surface roughness of less than 250 micro-inches, continuously coating a thin plastic film or polytetrahaloethylene resin on said surface, continuously progressively stripping said cast film from said metal carrier.

5. A method of making thin self-supporting polytetrahaloethylene resin film, comprising the steps of continuously polishing progressive portions of a relatively non-oxidizable metal carrier to provide a surface roughness of less than 250 micro-inches, continuously progressively casting a thin polytetrahaloethylene resin film on said polished portions of the metal carrier while other portions thereof are being polished, and continuously progressively stripping said cast film from said metal carrier.

6. A method of making thin self-supporting polytetrahaloethylene resin film, comprising the steps of continuously polishing progressive portions of a relatively non-oxidizable metal carrier to provide a surface roughness of less than 250 micro-inches, continuously progressively depositing a thin polytetrahaloethylene resin film on said polished portions of the metal carrier, said resin film consisting of an aqueous dispersion of polytetrahaloethylene resin particles including volatiles, continuously evaporating the water medium and contained volatiles at a temperature below the transition temperature below the transition temperature of the resin, continuously sintering the resin particles at a temperature above the transition temperature of the resin, thereby continuously forming a self-supporting film, continuously cooling said film to ambient room temperature, and continuously stripping the cooled film from said metal carrier.

References Cited in the file of this patent

UNITED STATES PATENTS

| | | |
|---|---|---|
| 2,144,548 | Safford | Jan. 17, 1939 |
| 2,293,673 | Hershberger | Aug. 18, 1942 |
| 2,346,765 | Kratz | Apr. 18, 1944 |
| 2,520,173 | Sanders | Aug. 29, 1950 |
| 2,540,962 | Puppolo | Feb. 6, 1951 |
| 2,710,266 | Hochberg | June 7, 1955 |
| 2,718,452 | Lontz | Sept. 20, 1955 |